(12) United States Patent
Hargett, Jr. et al.

(10) Patent No.: US 9,164,740 B2
(45) Date of Patent: Oct. 20, 2015

(54) SYSTEM AND METHOD FOR REPLACING JAVA BEANS

(71) Applicant: Toshiba Global Commerce Solutions Holdings Corporation, Tokyo (JP)

(72) Inventors: Bobby Ray Hargett, Jr., Raleigh, NC (US); Zachary McCain Darden, Morrisville, NC (US); Christopher Louis Capps, Apex, NC (US); Jarrad A. Giles, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

(21) Appl. No.: 14/278,925

(22) Filed: May 15, 2014

(65) Prior Publication Data
US 2014/0344779 A1 Nov. 20, 2014

Related U.S. Application Data (60) Provisional application No. 61/824,351, filed on May 16, 2013, provisional application No. 61/929,544, filed on Jan. 21, 2014, provisional application No. 61/950,513, filed on Mar. 10, 2014.

(51) Int. Cl.
*G06F 9/44* (2006.01)
*G06F 9/445* (2006.01)

(52) U.S. Cl.
CPC ............. *G06F 8/36* (2013.01); *G06F 9/44505* (2013.01)

(58) Field of Classification Search
USPC ................ 717/125–129, 140–142, 105–109, 717/120–122
IPC ............................. G06F 8/20, 8/35, 8/36, 8/70
See application file for complete search history.

(56) References Cited

U.S. PATENT DOCUMENTS

| | | | |
|---|---|---|---|
| 5,410,696 A | 4/1995 | Seki et al. | |
| 5,699,310 A * | 12/1997 | Garloff et al. | 717/108 |
| 5,898,872 A * | 4/1999 | Richley | 717/121 |
| 6,237,135 B1 * | 5/2001 | Timbol | 717/107 |
| 6,427,228 B1 | 7/2002 | Wigger | |
| 6,513,040 B1 | 1/2003 | Becker et al. | |
| 6,634,022 B1 | 10/2003 | Leermakers | |
| 6,662,236 B1 | 12/2003 | Apte et al. | |

(Continued)

OTHER PUBLICATIONS

Bucchiarone et al, "Towards an architectural approach for the dynamic and automatic composition of software components", ACM, pp. 12-21, 2006.*

(Continued)

*Primary Examiner* — Anil Khatri
(74) *Attorney, Agent, or Firm* — Coats & Bennett, PLLC (57) ABSTRACT

A method and apparatus is provided for reconfiguring application comprising a plurality of base code components at startup. A control application first retrieves the plurality of base components responsive to receiving a command to execute the application program. Prior to beginning execution, however, the control application replaces a selected base code component with another code component, and then subsequently replaces that newly inserted code component with yet another code component. Whether any given code component is to be replaced at startup is determined based on an annotation included in the code components. Once the application program has been reconfigured to include the appropriate code components, the application program is executed.

10 Claims, 4 Drawing Sheets

(56) References Cited

U.S. PATENT DOCUMENTS

| | | | |
|---|---|---|---|
| 6,663,257 B2* | 12/2003 | Galli | 362/119 |
| 6,684,370 B1 | 1/2004 | Sikorsky et al. | |
| 6,738,964 B1* | 5/2004 | Zink et al. | 717/105 |
| 6,742,175 B1* | 5/2004 | Brassard | 717/107 |
| 6,789,254 B2* | 9/2004 | Broussard | 717/147 |
| 6,851,107 B1* | 2/2005 | Coad et al. | 717/108 |
| 7,055,131 B2* | 5/2006 | Charisius et al. | 717/109 |
| 7,165,249 B2* | 1/2007 | Potter et al. | 717/174 |
| 7,827,527 B1* | 11/2010 | Chiluvuri | 717/109 |
| 8,060,857 B2 | 11/2011 | Biggerstaff | |
| 8,132,148 B2* | 3/2012 | Williams et al. | 717/107 |
| 8,171,454 B2* | 5/2012 | Sreedhar | 717/116 |
| 8,191,052 B2 | 5/2012 | Chamieh et al. | |
| 8,307,337 B2 | 11/2012 | Chamieh et al. | |
| 8,413,115 B1* | 4/2013 | Surprise et al. | 717/121 |
| 8,418,141 B2* | 4/2013 | Baeumer et al. | 717/122 |
| 8,522,194 B2* | 8/2013 | Kaetker et al. | 717/104 |
| 8,527,943 B1* | 9/2013 | Chiluvuri | 717/107 |
| 8,676,853 B2* | 3/2014 | Kasravi et al. | 707/792 |
| 8,713,528 B1* | 4/2014 | Conrad et al. | 717/124 |
| 9,009,658 B2* | 4/2015 | Sundararajan et al. | 717/107 |
| 2005/0010912 A1 | 1/2005 | Adolphson et al. | |
| 2006/0277158 A1 | 12/2006 | Kim | |
| 2010/0281072 A1 | 11/2010 | Cicman et al. | |
| 2013/0204874 A1 | 8/2013 | Frey | |

OTHER PUBLICATIONS

Rahman et al, "On the Relationships between Domain-Based Coupling and Code Clones: An Exploratory Study", IEEE, pp. 1265-1268, 2013.*

Arboleda et al, "Component Types Qualification in Java Legacy Code Driven by Communication Integrity Rules", ACM, pp. 155-164, 2011.*

Li et al, "A Wrapper Generator for Wrapping High Performance Legacy Codes as Java/CORBA Components", IEEE, pp. 1-12, 2000.*

Langhammer, "Co-Evolution of Component-based Architecture-Model and Object-Oriented Source Code", ACM, pp. 37-42, 2013.*

Lind et al, "Categorization of Real-Time Software Components for Code Size Estimation", ACM, pp. 1-10, 2010.*

"org.springframework.context.annotation Annotation Type Primary." 2 pages. 2013. Accessed at http://docs.spring.io/spring/docs/3.1.x/javadoc-api/org/springframework/context/annotation/Primary.html. Pivotal Software, Inc. San Francisco, CA.

* cited by examiner

SYSTEM AND METHOD FOR REPLACING JAVA BEANS

CROSS-REFERENCE TO RELATED APPLICATIONS

This application claims the benefit of U.S. Provisional Application No. 61/824,351, filed May 16, 2013, U.S. Provisional Application No. 61/929,544 filed Jan. 21, 2014, and U.S. Provisional Application No. 61/950,513, filed Mar. 10, 2014. Each of the '351, '544, and '513 provisional applications is expressly incorporated herein by reference in their entirety.

FIELD OF THE INVENTION

The present application relates generally to computing devices able to reconfigure application programs comprised of reusable code modules, and more particularly, to computer servers that reconfigure such application programs at startup by replacing selected ones of the reusable code modules.

BACKGROUND

A Point of Sale (POS) is often referred to as a location where a retail transaction is conducted. For example, it may be the point where a customer makes a payment to a retailer in exchange for goods or services. Further, the retailer may, at the POS, calculate an amount owed by the customer and provide options for the customer to make payment. A payment may be made by, for example, cash, a credit card, a debit card, or check. The retailer may issue a receipt to the customer for the transaction.

A Point of Commerce (POC) may broadly refer to shopping or retail transactions conducted within a "brick and mortar" retail store or at any location by use of a computing device that is suitably connected to a communications network. As an example, a customer may shop within a store and proceed to a checkout station to purchase one or more products obtained in the store. In another example, a customer may use his or her mobile computing device to shop for products at a retail website via a web browser. In this example, the customer may select products for purchase and subsequently conduct a purchase transaction with the mobile computing device.

Regardless of whether a given transaction is a POS transaction, or a POC transaction, however, such transactions are typically processed by application programs executing on network servers.

SUMMARY

The present disclosure provides a method and apparatus for dynamically reconfiguring application programs that support Point-of-Sale (POS) transactions and/or Point-of-Commerce transactions at startup. Further, embodiments of the present disclosure allow for the reconfiguration of selected portions of the application program multiple times.

In more detail, an application program comprises a plurality of base code components. Each code component, which may comprise, but is not limited to, JAVABEANS, for example, may be designed to perform a specific function in support of POS and/or POC operations at a server. Upon receiving a command to start executing the application program, the application program, a server executing the application program may first replace selected base code components with other code components created, for example, by an operator of the server or other third party. This allows such operators to customize the application program to include functionality that may not otherwise be provided by the base code components.

Additionally, in accordance with the present disclosure, these newly inserted code components may themselves be replaced by other code components prior to the start of the execution of the application program. This allows the operators of such servers an even broader capability for enhancing a custom function. Whether a given code component is to be replaced by another code component is determined by the values of one or more parameters in an annotation or command present in the code components.

Accordingly, in one embodiment, the present disclosure provides a method of reconfiguring an application program for execution on a computing device. In this embodiment, an application program comprising a plurality of base code components is retrieved from a memory circuit of the computing device responsive to receiving a command at the computing device to execute the application program. Prior to executing the application program, however, the method replaces a selected one of the base code components with a first code component. Such replacement is performed responsive to a command included in the first code component. Then, based on a command included in a second code component, the method determines that the first code component is to be replaced by the second code component. In compliance with the command in the second code component, the method replaces the first code component with the second code component. The reconfigured application program, including the second code component, is then executed by the computing device.

In another embodiment, the present disclosure provides a network server comprising a memory circuit and a processor circuit. The memory circuit is configured to store an application program comprised of a plurality of base code components. The processor circuit is configured to retrieve the plurality of base code components from the memory circuit responsive to receiving a command to execute the application program, and replace a selected one of the base code components with a first code component responsive to a command included in the first code component. Then, based on a command included in the second code component, the processor circuit subsequently determines that the first code component is to be replaced by a second code component. In response to the command in the second code component, the processor circuit replaces the first code component with the second code component. The computing device can then execute the application program that includes the second code component.

In one embodiment, the present disclosure provides a computer-readable medium having a control application stored thereon. The control application comprises instructions that, when executed by a server, configures a processor circuit associated with the server to retrieve a plurality of base components from a memory circuit. The base components comprise an application program that is to be executed by the processor circuit, and are retrieved in response to receiving a command to execute the application program. Prior to executing the application program, however, the control application causes the processor circuit to reconfigure the application program by replacing a selected base component with a first code component. Such responsive is triggered by a command included in the first code component. The control application then causes the processor circuit to subsequently reconfigure the application by replacing the first code component with a second code component. The subsequent replacement is also performed responsive to a command included in the second code component. Once configured, the control application controls the processor circuit to execute the application configured with the second code component.

Of course, those skilled in the art will appreciate that the present invention is not limited to the above contexts or examples, and will recognize additional features and advantages upon reading the following detailed description and upon viewing the accompanying drawings.

DETAILED DESCRIPTION

The present disclosure provides a method and apparatus for allowing a user of a Point-Of-Sale (POS) and/or Point-of-Commerce (POC) system to customize an application program that supports the users POS/POC operations. More particularly, the present disclosure allows the user to reconfigure an application program by replacing or substituting selected base code components of the application program framework with other substitute code components at startup. Additionally, the present disclosure permits users to subsequently replace those substitute code components with yet other substitute code components at startup. Thus, the embodiments of the present disclosure facilitate multiple layers of code component replacement. Further, as described in more detail later, whether to replace or substitute a given code component with another code component is determined based on annotations and their parameters that are included in the code components.

Figure 1:
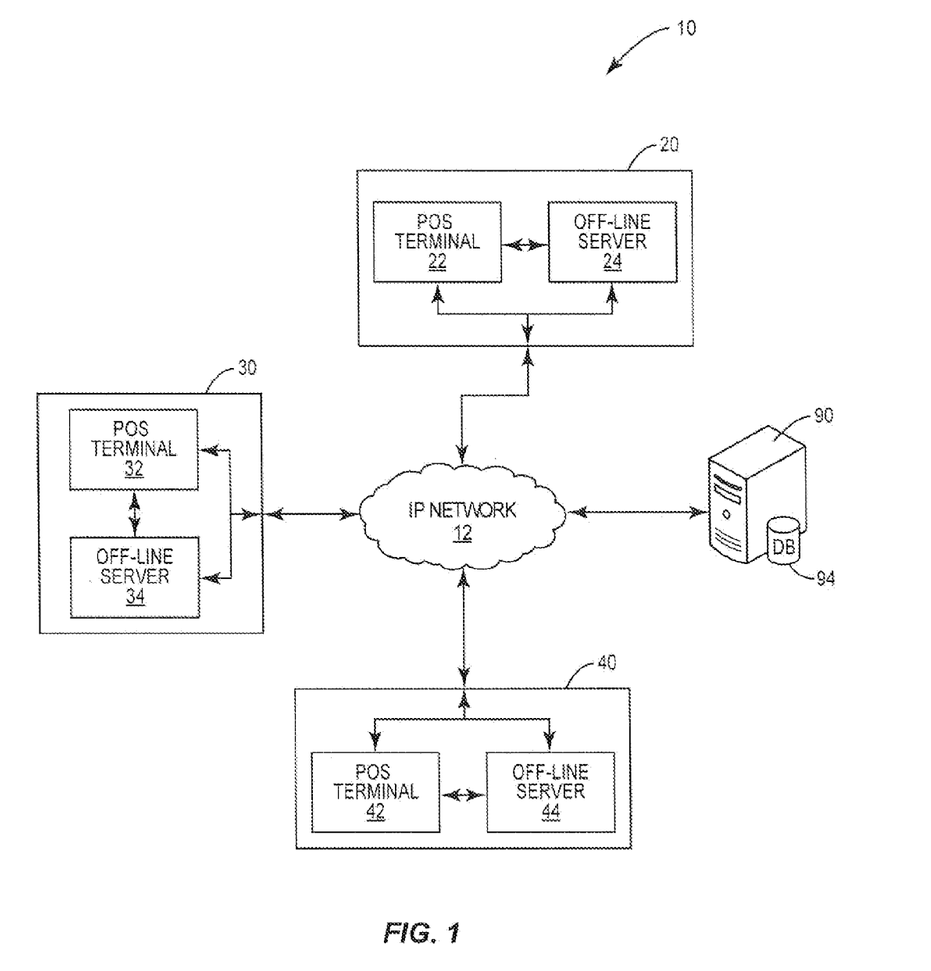
FIG. 1 is a functional block diagram illustrating a communications network for a Point-of-Sale (POS) system according to one embodiment of the present disclosure.

Turning now to the drawings, FIG. 1 is a block diagram illustrating a POS system 10 configured to function in accordance with one or more embodiments of the present disclosure. Those skilled in the art should appreciate that while the following embodiments are described with respect to a POS system, it is for illustrative purposes only. In fact, the present disclosure is not so limited and the embodiments described herein are equally applicable to POC operations and functions as well.

As seen in FIG. 1, POS system 10 comprises an IP network 12 that communicatively connects one or more merchant sites 20, 30, 40 to one or more enterprise servers 80. Each merchant site 20, 30, 40 comprises a respective POS terminal 22, 32, 42, and a respective offline server 24, 34, 44 which may communicate with each other via a local network connection. In general, customers purchase goods and/or services at the merchant sites 20, 30, 40. The information associated with a given purchase, or other transaction, is then communicated to the enterprise server 90 by the POS terminal 22, 32, 42, and approved or denied by business logic executing at the enterprise server 90. The approval/denial indication is then sent back to the POS terminal 22, 32, 42 via network 12 to inform the merchant.

In some POS systems 10, the POS terminals 22, 32, 42 communicate directly with the enterprise server 90 to transfer data and information regarding a given transaction. In other embodiments, however, the POS terminals 22, 32, 42 communicate with their respective offline servers 24, 34, 44. Such situations may occur, for example, when communications between the POS terminals 22, 32, 42 and the enterprise server are interrupted. This allows the merchants to continue processing business transactions until communications is restored. Once communications is restored, the offline server 24, 34, 44 communicates the data it received during the interruption to the enterprise server 90.

The IP network 12 may comprise one or more public or private communication networks that communicate packets of data between the merchant sites 20, 30, 40 and the enterprise server 90. Such IP networks 12 and the methods they use to carry packet data are well-known in the art; however, for completeness, IP network 12 may comprise the Internet and/or other public and private networks capable of communicating data packets using the well-understood Transmission Control Part (TCP)/Internet Protocol (IP).

The POS terminals 22, 32, 42 comprise an electronic point-of-sale terminal that facilitates the purchases of the goods and servers. By way of example only, the POS terminals 22, 32, 42 seen in FIG. 1 may comprise electronic cash registers, card readers, smartphones equipped with such card readers, and the like. In operation, the POS terminals 22, 32, 43 obtain customer data (e.g., credit card number, expiration date, cost, etc.), as well as merchant data (e.g., merchant ID, etc.), and transmit that data to the enterprise server 90 via IP network 12. Based on the information contained in a response received from the enterprise server 90, the POS terminal 22, 32, 42 will indicate to the merchant whether the transaction was approved or denied. Further, as stated above, the POS terminals 22, 32, 42 are able to communicate their data to their respective offline servers 24, 34, 44 in cases where communications with the enterprise server 90 has been interrupted.

The enterprise server 90 comprises a network-based computing device that connects to a database (DB) 86, and executes the business logic that supports the transactions at the merchant sites 20, 30, 40. Particularly, the enterprise server 90 receives data and information from the POS terminals 22, 32, 42, and uses that data and information, along with other information retrieved from DB 86, for example, as input into the business logic to approve or deny a given transaction. In addition, the enterprise server 90 may also maintain the data in DB 86, which may comprise payment data, warehouse information, and inventory information, for example, and "push" some or all of that information, as well as the business logic, to the POS terminals 22, 32, 42, and/or offline servers 24, 34, 44.

As described previously, pushing the business logic and data required for performing transactions to the devices 22, 32, 42 and/or 24, 34, 44, the enterprise server 90 configures the offline server 24, 34, 44 to be able to function as a "backup" enterprise server 90. Specifically, the offline servers 24, 34, 44 would be configured to, with some constraints or limitations, perform transactions in situations where communication with the enterprise server 90 has been interrupted. Once communications are restored, the data and information collected temporarily by the POS terminals 22, 32, 42 and/or the offline servers 24, 34, 44 is transmitted to the enterprise server 90 to ensure that the merchant site 20, 30, 40 and the enterprise server 90 remain synced.

Typically, customers use the business logic provided on the enterprise server 90 to facilitate their commerce operations. The business logic may be written in any known language, but generally comprises a plurality of individual modules or code components that perform different functions. An example of such code components are JAVABEANS. JAVABEANS, which are well-known in the art, comprise reusable software components for JAVA. In more detail, a JAVABEAN is a class that encapsulates many objects into a single object (i.e., the JAVABEAN). JAVABEANS may be serializable, have a 0-argument constructor, and allow access to properties using getter ( ) and setter ( ) methods.

In some instances, customers operating POS system 10 want to extend the development framework of the business logic. One way to do this is to modify the functions of a given JAVABEAN. Currently, there are existing tools that helps users modify the business logic. For example, the Spring Tool Suite (STS) is an open source software tool that uses convention-over-configuration principles to provide rapid development of JAVA-based enterprise software. However, STS only allows for a single layer of replacement. That is, STS only allows a customer (e.g., a developer) to replace a first JAVABEAN with a second JAVABEAN. STS, and other tools like it, however, are limited in that they will not allow the customer to then subsequently replace the second JAVABEAN with a third JAVABEAN. Such constraints make it impossible for a customer of a services team, for example, to have a custom function of a selected code component where that selected code component has already been used to replace a code component. Accordingly, in one or more embodiments of the present disclosure, a system and method is provided that allows for such multiple substitution of a JAVABEAN or code component, thereby allowing customers to further customize the implementation of a desired function.

More particularly, the present disclosure provides a process in which a customer that is already running a customized solution of the base business logic to further customize selected portions of that logic. This process is achieved by defining a new annotation—i.e., "Replace ( )"—that allows the framework to determine, based on priority and provider, which code component to actually instantiate and deliver to dependent functions.

As an example, consider a base framework for an application program, such as the business logic executed at enterprise server 90, for example, that comprises a base code component A. An extender of that framework may have a first code component AB annotated with:

@Replace (Provider=X, Priority=0).

The default for the Priority parameter is in this embodiment, 0. Upon reading this annotation at start up, the extender would replace the base code component A with code component AB.

Subsequently, a customer of the extender may wish to replace the newly-substituted code component AB with a second code component ABC. Therefore, the customer of the extender would annotate the code component ABC with:

@Replace(Provider=Customer, Priority=0).

At startup, and in response to the command, the extender would replace the code component AB with the newly identified code component ABC.

At some future time, such as during a functional verification test (FVT) of the application, for example, the same customer (e.g., a developer or tester) may want to replace code component ABC with another code component ABCTester. Accordingly, the customer would annotate code component ABCTester with:

@Replace(Provider=Customer, Priority=1).

At startup, the enterprise server 90 executing the business logic would then execute the business logic to include the code component ABCTester, rather than the code components A, AB, and ABC.

Figure 2:
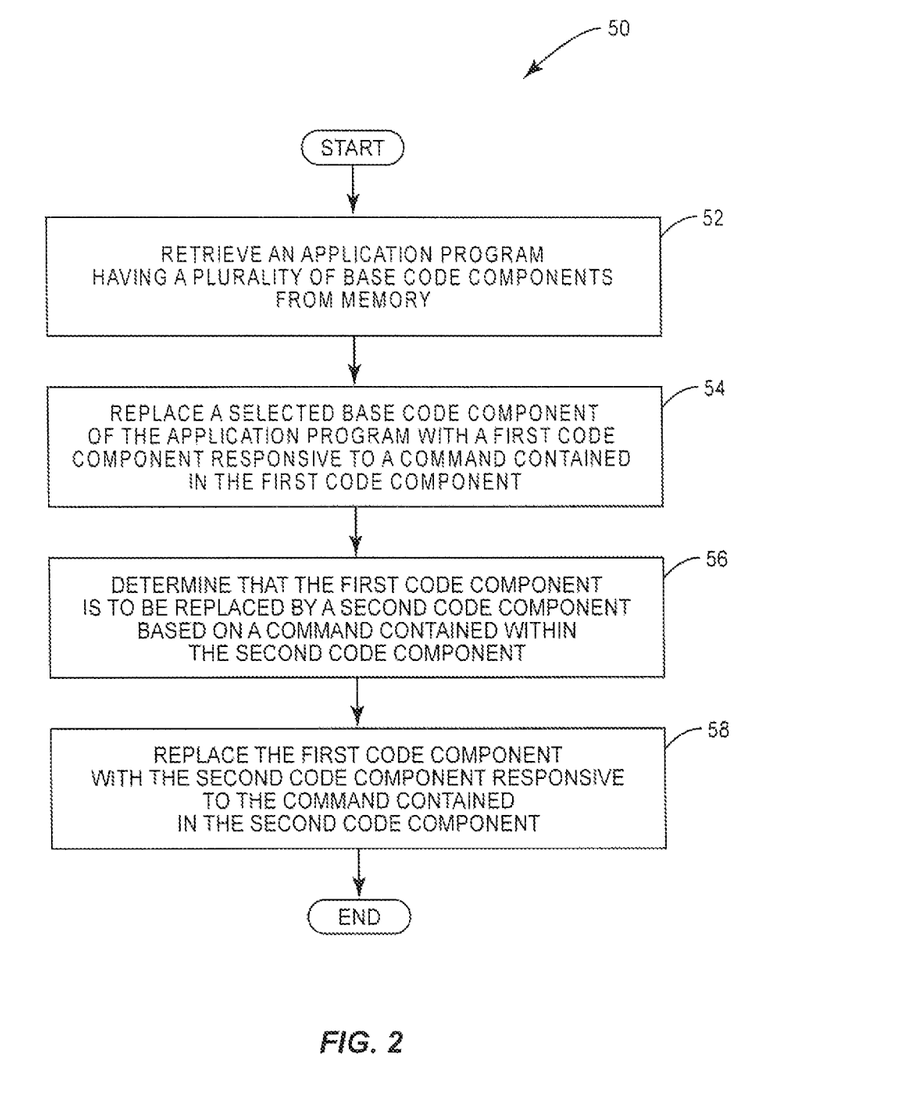
FIG. 2 is a flow diagram illustrating a method for reconfiguring an application program at startup according to one embodiment of the present disclosure.

FIG. 2 is a flow diagram illustrating a method 50 for reconfiguring an application program (e.g., the business logic executing on the enterprise server 90) according to one embodiment. As described later, however, this method may also be employed to reconfigure an application program executing on other devices, such as the offline servers 24, 34, 44, for example.

As seen in FIG. 2, method 50 begins when the enterprise server 90 retrieves an application program from a memory circuit. As stated above, the application program is comprised of a plurality of base code components exemplified herein for clarity as JAVABEANS (box 52). According to the present disclosure, the enterprise server 90 may be configured to replace a selected one of the base code components (e.g., JAVABEAN 'A') with another, first code component (e.g., JAVABEAN 'AB'). The replacement may be triggered, for example, by the presence of a command or annotation (i.e., the above-mentioned "REPLACE" function) included in the first code component (box 54).

Thereafter, the enterprise server 90 may determine that the first code component JAVABEAN 'AB', which already replaced the base code component JAVABEAN 'A', must itself be replaced by a second code component JAVABEAN 'ABC'. As above, the subsequent determination to replace the first code component Java-Be-aft JAVABEAN 'AB' is based on another command or annotation (i.e., the REPLACE command) included in the second code component JAVABEAN 'ABC' (box 56). So determined, the enterprise server 90 replaces the first JAVABEAN 'AB' with the second JAVABEAN 'ABC' (box 58). Upon completing the JAVABEAN substitutions, the application program, configured with JAVABEAN 'ABC', is executed.

Figure 3:
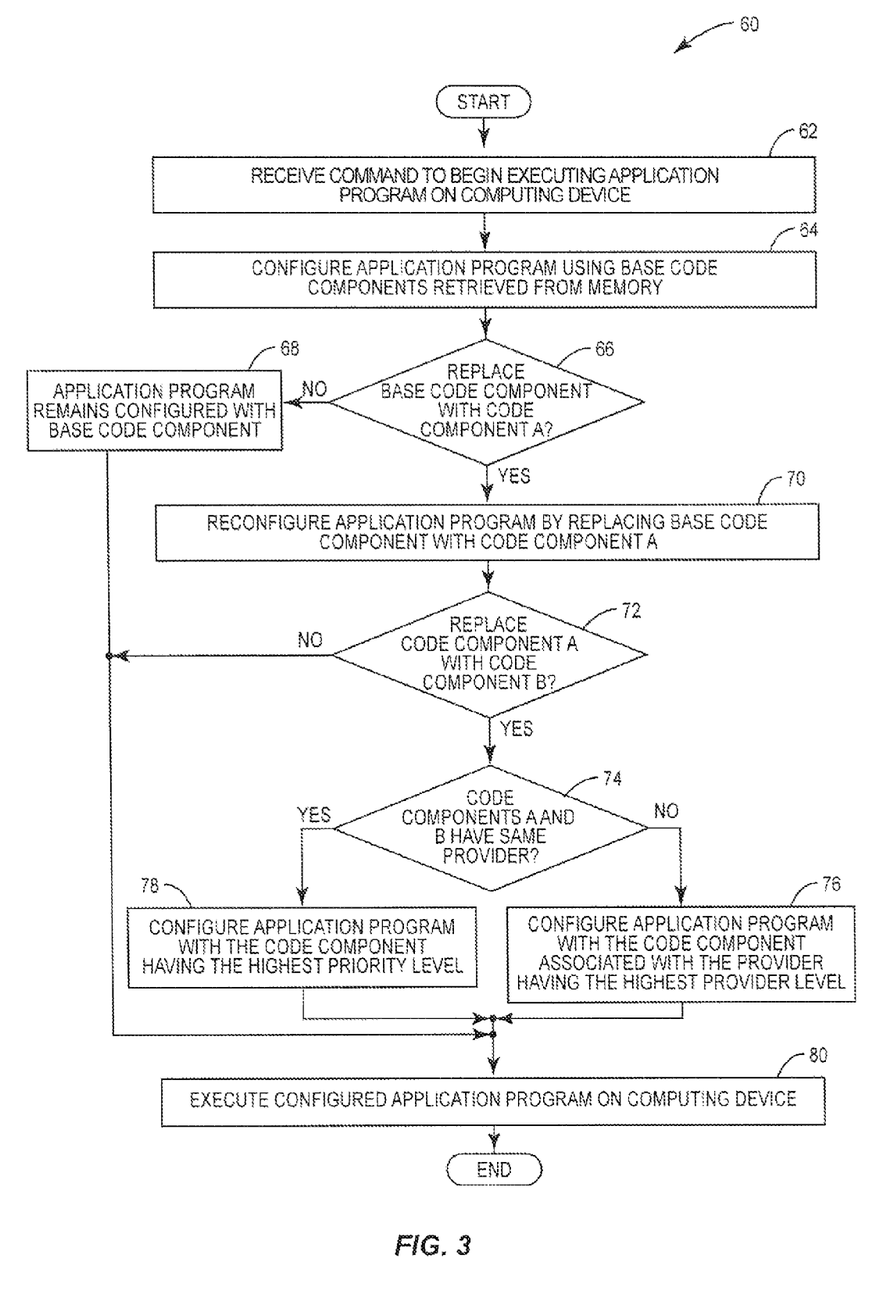
FIG. 3 is a flow diagram illustrating a method for replacing the code components that comprise an application program with other code components according to one embodiment of the present disclosure.

FIG. 3 is a flow diagram illustrating a method 60 for reconfiguring an application program according embodiments of the present disclosure in more detail. Particularly, method 60 begins with the enterprise server 90 receiving a command to execute the application logic (e.g., the POS business logic) on the enterprise server 90 (box 62). As above, the application program in this embodiment comprises a plurality of reusable code components, such as an JAVABEANS, for example, that are stored in a memory circuit accessible to the enterprise server 90. Upon receiving the command, the enterprise server 90 retrieves the JAVABEANS that comprise the application program from memory, and begins processing the JAVABEANS. Particularly, the enterprise server 90 initially configures the application program to utilize a base set of JAVABEANS (box 64), and then replaces selected ones of the base set of JAVABEANS with other JAVABEANS.

More particularly, the enterprise server 90 inspects the user-defined JAVABEANS to determine whether any of those JAVABEANS are to REPLACE a JAVABEAN in the base set. If a first JAVABEAN (i.e., JAVABEAN 'A') does not include a REPLACE command (box 66), the application program remains configured with the base JAVABEAN (box 68) for program execution (box 80). Otherwise, if JAVABEAN 'A' does include a REPLACE command (box 66), the enterprise server 90 will reconfigure the application program by replacing the base JAVABEAN with JAVABEAN A (box 70). The enterprise server 90 will then determine whether a second JAVABEAN (i.e., JAVABEAN B) is intended to replace JAVABEAN 'A' (box 72). If not, the method 60 ends with the application program being configured and executed with the base set of JAVABEANS and JAVABEAN 'A' (box 80). However, if the JAVABEAN 'B' is intended to replace JAVABEAN 'A' (box 72), the enterprise server 90 determines whether JAVABEANS 'A' and 'B' have the same provider, or a different provider (box 74). Particularly, if the two JAVABEANS are created by different providers, the enterprise server 90 will configure the application program to use whichever JAVABEAN (i.e., JAVABEAN 'A' or JAVABEAN 'B') is associated with the provider having the higher priority level (box 76). Otherwise, if the two JAVABEANS are created by the same provider, the enterprise server 90 will configure the application program with whichever JAVABEAN has the highest priority level (box 78). As seen above, the priority level and the provider are included as parameter values in the REPLACE command of the JAVABEAN. Once the application program has been configured with the appropriate JAVABEANS, the enterprise server 90 executes the application program (box 80).

Figure 4:
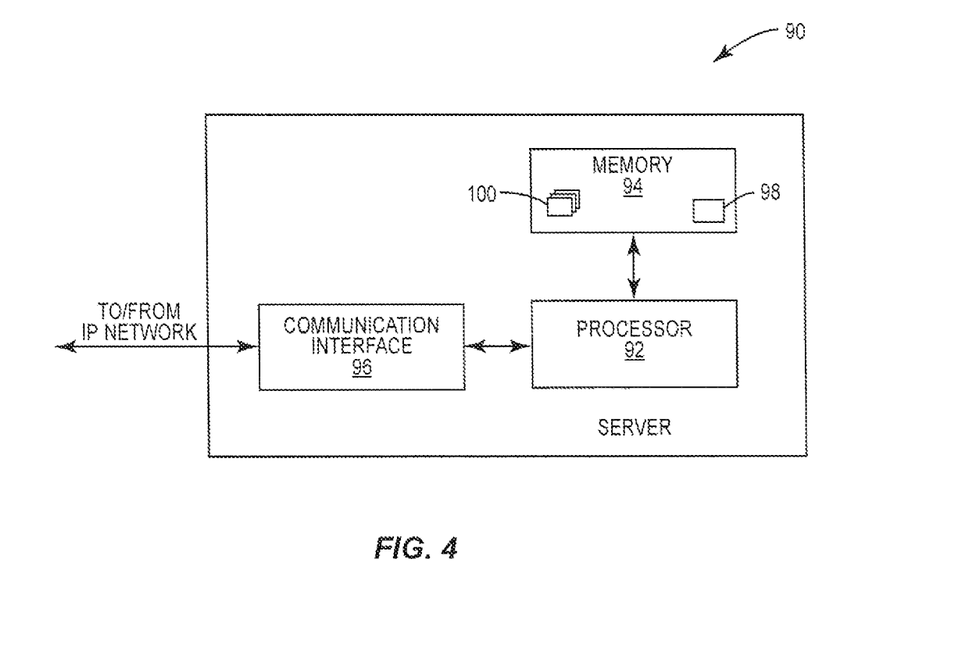
FIG. 4 is a functional block diagram illustrating some component parts of a network server configured to reconfigure application programs according to one embodiment of the present disclosure.

FIG. 4 is a block diagram illustrating some of the functional components of enterprise server 90 configured according to one embodiment of the present disclosure. Those of ordinary skill in the art will appreciate, however, that the depiction of the enterprise server 90 in FIG. 4 is for illustrative purposes only. It should be noted that FIG. 4 is also applicable to the offline servers 24, 34, 44 seen previously in FIG. 1.

As seen in FIG. 4, the enterprise server 90 comprises a processor circuit 92, a memory 94 that stores a control application 98 and the business logic 100 comprised of a plurality reusable code components, and a communication interface 96. The processor circuit 92, which in some embodiments may comprise a plurality of separate processor circuits, may comprise any sequential state machine operative to execute machine instructions stored as machine-readable computer programs in the memory circuit 86, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software, or any combination of the above.

The processor circuit 92 is generally configured to control the operations and functions of the enterprise server 90 according to the data and instructions stored in memory 94. This includes being controlled to perform the previously described functions in accordance with the control application 98 and the business logic 100.

The memory circuit 94 is operatively connected to processor circuit 92, and may comprise any non-transitory machine-readable media known in the art. Such media includes, but is not limited to, SRAM, DRAM, DDRAM, ROM, PROM, EPROM, Flash memory, and the like. In one embodiment, the memory 94 comprises memory that is positioned on the inside of the enterprise server 90. In other embodiments, however, it is not. Thus, in at least some embodiments, memory circuit 94 comprises an external database server communicatively connected to the enterprise server 90.

The communications interface 96 may comprise, for example, an ETHERNET interface or a wireless interface, such as a WiFi interface operating according to any of the 802.XX protocols. Communications interface 96 allows the enterprise server 90 to communicate data and messages with remote terminals, such as those devices associated with the merchant sites 20, 30, 40, for example, as well as with other devices connected to the enterprise server 90 via IP network 12 using any of a variety of well-known and well-documented protocols, such as TCP/IP, for example. Other communication interfaces not specifically mentioned herein are also possible.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A method of reconfiguring an application program for execution on a computing device, the method comprising:
   retrieving an application program comprising a plurality of base code components from a memory circuit of the computing device responsive to receiving a command to execute the application program;
   replacing a selected base code component of the application program with a first code component responsive to a command included in the first code component;
   determining that the first code component is to be replaced by a second code component based on a command included in the second code component;
   determining whether the first and second code components are associated with a same or different provider; and
   replacing the first code component with the second code component responsive to the command included in the second code component, wherein if the providers for the first and second code components are different, replacing the first code component with the second code component comprises:
   identifying a provider level for each provider; and
   reconfiguring the application program to include the second code component if the provider level for the provider associated with the second code component exceeds the provider level for the provider associated with the first code component.

2. The method of claim 1 wherein determining whether the first and second code components are associated with a same or different provider comprises comparing respective values for a provider identifier parameter included in each of the commands associated with the first and second code components.

3. The method of claim 1 wherein if the providers for the first and second code components are the same, replacing the first code component with the second code component comprises:
   identifying a priority level for each of the first and second code components; and
   reconfiguring the application program to include the second code component if the priority level of the second code component exceeds the priority level of the first code component.

4. The method of claim 3 further comprising comparing respective values for a priority level parameter in each of the commands associated with the first and second code components.

5. A server comprising:
   a memory circuit configured to store an application program comprising a plurality of base code components;
   a processor circuit configured to:
   retrieve the plurality of base code components from the memory circuit responsive to receiving a command to execute the application program;
   replace a selected base code component with a first code component responsive to a command included in the first code component;
   determine that the first code component is to be replaced by a second code component based on a command included in the second code component;

determine whether the first and second code components are associated with a same or different provider; and replace the first code component with the second code component responsive to the command included in the second code component, wherein if the providers for the first and second code components are different, the processor circuit is further configured to:

identify a provider level for each provider; and reconfigure the application program to include the second code component if the provider level for the provider associated with the second code component exceeds the provider level for the provider associated with the first code component.

6. The server of claim 5 wherein to determine whether the first and second code components are associated with a same or different provider, the processor circuit is further configured to compare respective values for a provider identifier parameter included in each of the commands associated with the first and second code components.

7. The server of claim 5 wherein if the providers for the first and second code components are the same, the processor circuit is further configured to:

identify a priority level for each of the first and second code components; and reconfigure the application program to include the second code component if the priority level of the second code component exceeds the priority level of the first code component.

8. The server of claim 7 wherein the processor circuit is further configured to compare respective values for the priority levels of each of the first and second code components.

9. The server of claim 5 wherein the processor circuit is further configured to execute the application program configured with the second code component.

10. A computer-readable medium having a control application stored thereon, the control application comprising instructions that, when executed by a server, configures a processor circuit associated with the server to:

retrieve a plurality of base components comprising an application program from a memory circuit responsive to receiving a command to execute the application program;

reconfigure the application program by replacing a selected base component with a first code component responsive to a command included in the first code component;

determine that the first code component is to be replaced by a second code component based on a command included in the second code component;

determine whether the first and second code components are associated with a same or different provider; and subsequently reconfigure the application by replacing the first code component with the second code component responsive to a command included in the second code component, wherein if the providers for the first and second code components are different, the control application is configured to control the processor circuit to:

identify a provider level for each provider; and reconfigure the application program to include the second code component if the provider level for the provider associated with the second code component exceeds the provider level for the provider associated with the first code component.

* * * * *